April 30, 1940.  F. E. HAMILTON  2,199,129

MIXING VALVE

Filed Feb. 4, 1938

Witness
Paul F. Bryant

Inventor
Frank E. Hamilton

Patented Apr. 30, 1940

2,199,129

UNITED STATES PATENT OFFICE 2,199,129

MIXING VALVE

Frank E. Hamilton, Scarsdale, N. Y.

Application February 4, 1938, Serial No. 188,715

3 Claims. (Cl. 236—12)

The present invention relates to automatic mixing valves, more particularly designed for the maintenance of a predetermined temperature of mixed hot and cold water.

It is the object of the present invention to provide a valve which shall maintain substantially a predetermined temperature independently of variations both in temperature and pressure of the hot and cold supply, and in addition to provide in such a valve means for automatically shutting off the flow of water in the event of virtual cessation of the cold supply.

With these and other objects in view, the various features of the invention consist in certain novel features of construction, combinations and arrangements of parts hereinafter described and claimed, the advantages of which will be obvious to those skilled in the art from the following description.

Figure 1:
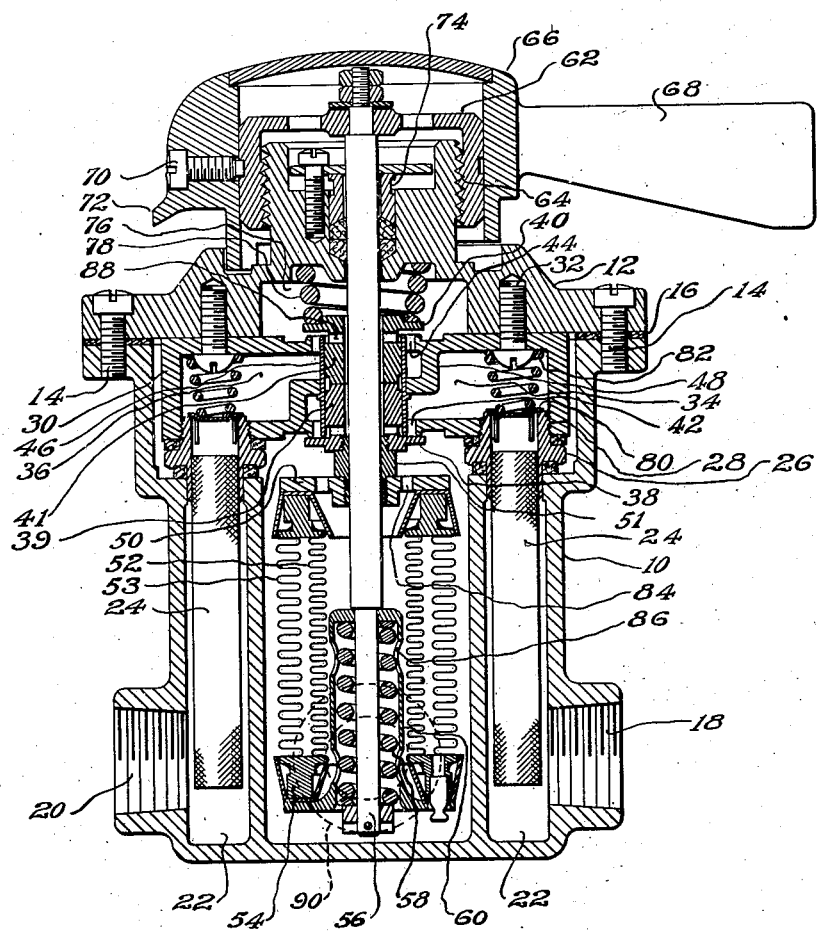
Figure 2:
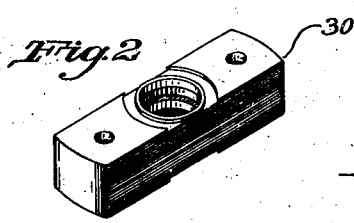

In the accompanying drawing illustrating the preferred form of the invention, Fig. 1 represents a section in elevation of my improved valve; and Fig. 2 is a detail illustrating a perspective view of the valve cage.

Generally speaking, the valve shown in the illustrated embodiment of the invention provides for simultaneously metering both the cold and hot supply in a manner to maintain a relatively constant temperature of mixed water. Control of the metering devices is obtained by a bellows thermostat located in the mixed water chamber and subject to the temperature thereof. The bellows thermostat is double walled to provide an annular space solidly filled with liquid, making it extremely sensitive to changes in temperature of the mixed water. This thermostat is connected to two disk valves controlling the hot and cold supply, respectively, and arranged in tandem so that both valves are operated simultaneously by movements of the thermostat. Adjustment of operating temperature is obtained by movement of the anchor point of the thermostat through an appropriate handle mounted at the upper end of the valve. The operating thermostat, the metering valves and associated parts are all mounted upon a detachable head which, upon separation from the housing of the valve, may be readily removed, carrying the associated parts therewith.

Referring particularly to the illustrated embodiment of the invention, the housing of the valve is indicated at 10, and has detachably connected therewith a head 12 which is secured to the housing through bolts 14, the two members being sealed at their meeting faces by a gasket 16. The housing proper is provided with a hot water intake 18 and a cold water intake 20, disposed at the opposite side. Each of these intakes communicates with a lengthwise passage 22 extending upwardly throughout the housing and having received therein a strainer 24 which screens the water in each case before admission to the valve. The strainer, as will be noted, is provided with an attaching thimble 26 threaded at 28 to the valve cage, and serving as a connection between the valve cage and screen for both hot and cold water ducts.

The head 12, which is circular in formation, has mounted thereon a rectangular valve cage 30, as shown more particularly in Fig. 2 of the drawing. This valve cage is bolted to the head by members 32, and is provided with separate and independent passages 34 and 36 which communicate with the hot and cold water supplies respectively. Outlets from the chambers 34 and 36 which are formed within the valve cage are controlled respectively by disk valves 38 and 40, which normally cooperate with annular passages 42 and 44. These passages are provided by a tubular sleeve 46 which extends through the valve cage as indicated, is held in place by the partition rib 48, and provides in conjunction with the opposite walls of the cage the passages themselves. Slidingly received within the sleeve 46 are hub portions 39 and 41, forming a part of the valve disks 38 and 40, the two parts being made separately for convenience of assembly.

With this construction it will be noted that the assembled portions of the valve move lengthwise of the sleeve until the disk valves at opposite ends thereof contact with their respective seats. The lower portion of the valve assembly is connected with a bellows head 50 through a collar 51. This bellows head forms a part of a double-walled bellows having inner and outer convolutions 52 and 53, the opposite ends of the bellows convolutions being secured to a similar head 54. The annular space between the inner and outer convolutions is filled with an expansible liquid or vapor which may be ether to cause instant and rapid expansion and contraction with changes of external temperature. The head 54, which may normally be considered as the anchor point of the bellows unit, is supported upon an adjusting stem 56 which extends lengthwise of the valve assembly and through the metering valves themselves. This stem is yieldably connected to the head 54 through a compression spring 58 received within a cage 60 for the purpose of permitting overtravel of the bellows in the event that the lower or hot water valve 38 has seated through expansion of the bellows and the temperature still continues to rise, causing further expansion. Under normal conditions of operation the spring is stiff enough to avoid flexure and anchor the bellows at a predetermined point. In the event of excessive pressure being developed, however, the spring will yield to prevent breakage.

The adjustment of operating temperature is secured by shifting the anchor point of the bellows unit together with the connected valve assembly, moving the hot and cold water valves respectively toward and away from their seats, or vice versa, as the case may be. For this purpose the upper end of the stem which extends completely through the valve assembly and terminates above the head 12 is connected with an adjusting head 62, which is internally threaded and engages with an externally threaded extension 64 upon the head. The rotating head 62 is received within an outer head 66 provided with a handle 68 and connected thereto through a set screw 70, all for the purpose of causing rotation of the handle to impart a corresponding rotation to the head, with a traversing of the head and stem longitudinally by virtue of such rotation to properly adjust the anchor point of the valve. The head 66 may be provided with a pointer 72, which indicates the nature of the adjustment in connection with a fixed scale formed upon the head 12.

The stem 56 is sealed in its passage through the stationary head 12 by a stuffing box assembly indicated generally at 74, which forms no part of the present invention.

Located within a chamber 76 in the head 12 is a loading spring 78 which engages with the cold water valve 40 and tends not only to maintain the two parts of the tandem valve in assembled relation, but to return the valve following contraction of the bellows. The delivery ends of both the hot and cold water screens are provided with check valves 80, normally closed by springs 82, which serve to prevent entrance of cold water into the hot water line, or vice versa, if the pressures of the cold and hot water respectively vary substantially.

With this construction it will be observed that hot water entering the intake 18 and cold water entering the intake 20 are conducted through the separate chambers 22, screened and delivered to the separate hot and cold water chambers 34 and 36 in the valve cage. Delivery of the hot and cold water from these chambers to the general mixing chamber is controlled and metered by the valves 38 and 40, both the hot and cold water being delivered radially into the mixing chamber and the mixed water thence being conducted downwardly about the bellows unit due to the large open space surrounding the valve cage.

It will be noted that the valve cage is generally rectangular and of the form shown in Fig. 2, whereas the housing within which it is seated is circular, affording an ample space thereabout for the passage of water. As the temperature of the mixed water rises, the bellows unit expands, causing the hot water valve to approach its seat, and the cold water valve to correspondingly recede from its seat, to provide an instant metering and response to changes in mixed water temperature. This action is made even more responsive by the use of the annular unit which provides for the free flow of mixed water not only externally of the unit, but through the interior of the unit, by virtue of the openings 84 formed in the head to permit the mixed water to enter internally, pass downwardly and outwardly through openings 86 in the spring cage. The valve heads 39 and 41 provide for clearance about the valve stem, and each is provided with radial passages 88 communicating with the inner portion for the free circulation of water therethrough.

If necessary to dismantle for cleaning or other purposes, the valve assembly as a whole may be readily dismounted by removing the fastening screws 14 which connect the head, and thereafter lifting the head together with all of the connected parts bodily from the housing without requiring any disconnection of the housing from the attached piping to which it is joined.

After passing through the mixing chamber, the mixed water is delivered from the valve through an opening 90 communicating directly with the lower portion of the mixing chamber, as indicated.

What is claimed is:

1. A mixing valve assembly, comprising a casing member having a mixing chamber extending throughout the major portion thereof, hot and cold water passages extending longitudinally of the casing and partitioned from the mixing chamber, a valve casing substantially smaller in cross-section than the mixing chamber which extends thereabout, the valve casing having independent chambers therein communicating respectively with the hot and cold water passages, an operating stem extending longitudinally of the mixing chamber and through the valve casing, a thermostatic unit connected with the stem to move it longitudinally upon changes in temperature, ports venting from each of the chambers in the valve casing into the mixing chamber, the ports being disposed annularly with respect to the stem and discharging in opposite directions lengthwise of the stem into the mixing chamber, and separate valve disks mounted upon the stem and operating as a tandem unit disposed to close and to meter the ports venting into the mixing chamber upon movement of the stem in opposite directions.

2. A mixing valve assembly, comprising a mixing chamber, a valve casing smaller in cross-section than the mixing chamber mounted therein, hot and cold water passages communicating with the valve casing, two separate chambers in the valve casing each communicating with a passage, a partition rib dividing the chambers in the casing, a guide tube mounted in the partition and providing in conjunction with the casing oppositely directed annular ports, and two disk valves controlling flow through each port, the disk valves facing in opposite directions and mounted to move as a unit.

3. A mixing valve assembly, comprising a casing having a mixing chamber extending therethrough, hot and cold water passages of relatively small cross-section formed in the casing independent of the mixing chamber, a valve casing of small cross-section with respect to the mixing chamber having two chambers therein each communicating with a passage, the ports discharging in opposite directions from the valve chambers into the mixing chamber, an operating stem extending lengthwise of the mixing chamber and through the valve casing, valve disks mounted upon the stem controlling discharge through the ports, and an annular bellows unit located in the mixing chamber and connected to one end of the operating stem to move the latter longitudinally as affected by the flow of water thereabout and therethrough in the mixing chamber.

FRANK E. HAMILTON.